United States Patent

Beasley

[15] 3,683,456
[45] Aug. 15, 1972

[54] HAND OPERATED FISH SKINNING TOOL

[72] Inventor: Donald L. Beasley, Des Moines, Iowa

[73] Assignee: Townsend Engineering Company, Des Moines, Iowa

[22] Filed: June 17, 1970

[21] Appl. No.: 47,047

[52] U.S. Cl. .................................................... 17/67
[51] Int. Cl. .............................................. A22c 25/17
[58] Field of Search ........ 17/66, 67, 29, 21; 146/130, 146/203

[56] References Cited

UNITED STATES PATENTS 2,547,237   4/1951   Townsend ..................... 17/67
2,275,884   3/1942   Barker .......................... 17/29

*Primary Examiner*—Lucie H. Laudenslager
*Attorney*—Zarley, McKee & Thomte

[57] ABSTRACT

A hand operated fish skinning tool of the pliers type comprising first and second lever members pivoted together and having cooperating handle portions. The first lever member includes a pair of spaced apart arms having a bolt member rotatably extending therebetween. A toothed roller is mounted on the bolt member for rotation therewith between the arms. A wing nut embraces the head of the bolt member outwardly of one of the arms with a nut being threadedly mounted on the other end of the bolt member outwardly of the other arm. First and second collars embrace opposite ends of the bolt member and rotatably extend through the first and second arms respectively. The outer end of the first collar frictionally engages the wing nut with the inner end of the first collar frictionally engaging one end of the roller. The inner end of the second collar frictionally engages the other end of the roller with the outer end of the collar frictionally engaging the nut. The second lever member has a curved pressure surface formed thereon which is adapted to engage and partially extend around the roller when the lever members are pivoted together.

5 Claims, 5 Drawing Figures

PATENTED AUG 15 1972
3,683,456
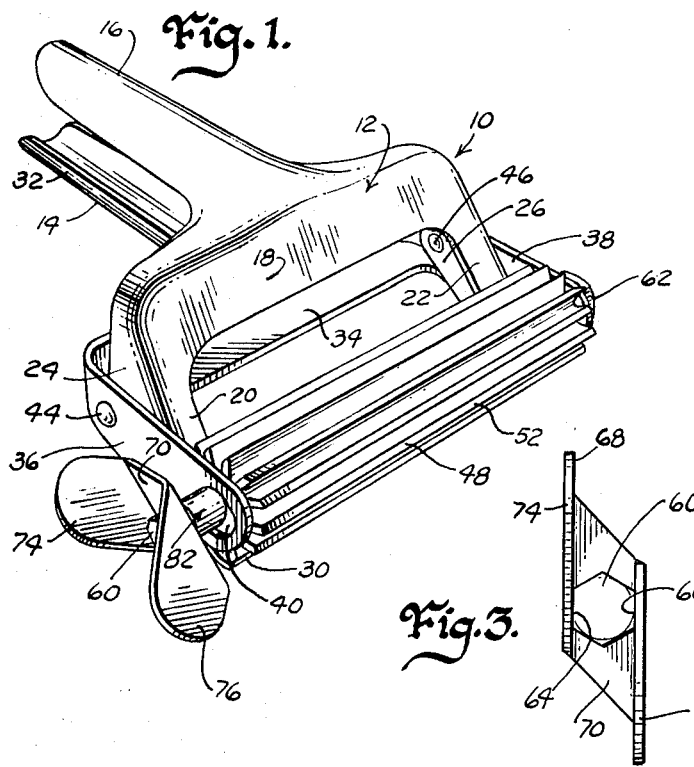
Inventor
Donald L. Beasley
by Zarley, McKee & Thomte
Attorneys

HAND OPERATED FISH SKINNING TOOL

This invention relates to an improvement in the device disclosed in the U.S. Pat. No. 2,547,237 which issued on Apr. 3, 1951. While the earlier device was quite satisfactory, some difficulty was experienced in the manufacture and assembly thereof. Additionally, certain components of the earlier device are quite expensive to manufacture and are not readily available when replacement parts are needed.

Therefore, it is a principle object of this invention to provide an improved fish skinning device.

A further object of this invention is to provide a hand operated fish skinning device wherein the toothed roller is mounted on a bolt member which is readily available.

A further object of this invention is to provide a hand operated fish skinning device including a wing nut which embraces one end of a bolt member which supports the toothed roller.

A further object of this invention is to provide a hand operated fish skinning tool including means to center the toothed roller with respect to the bolt upon which it is mounted.

A further object of this invention is to provide a hand operated fish skinning tool which prevents slippage of the wing nut with respect to the toothed roller.

A further object of this invention is to provide a hand operated fish skinning tool which is economical to manufacture, durable in use and refined in appearance.

There and other objects will be apparent to those skilled in the art.

This invention consists in the construction, arrangements, and combination of the various parts of the device, whereby the objects contemplated are attained as hereinafter more fully set forth, specifically pointed out in the claims and illustrated in the accompanying drawings in which:

FIG. 1 is a front perspective view of the device of this invention;

FIG. 2 is a partial exploded perspective view of the roller, collar, washer and wing nut with the bolt member being shown in broken lines;

FIG. 3 is and end view illustrating the relationship of the head portion of the bolt member and the wing nut;

FIG. 4 is a sectional view as seen along lines 4—4 of FIG. 5; and

FIG. 5 is a sectional view as seen along lines 5—5 of FIG. 4.

The tool of this invention is referred to generally by the reference numeral 10 comprising lever members 12 and 14 which are pivoted together as illustrated in FIG. 1. Lever member 12 includes a handle portion 16 which merges into a transverse portion 18 having arms 20 and 22 extending transversely forwardly therefrom. Arms 20 and 22 include flat vertically disposed side portion 25 and 26 respectively. A curved pressure surface 28 extends between the forward ends of the arms 20 and 22 and includes a leading cutting edge 30.

Lever member 14 includes a handle portion 32 which merges into a transverse portion 34 having arms 36 and 38 extending forwardly therefrom outwardly of the arms 24 and 26 as illustrated in FIG. 1. Arms 36 and 38 are vertically disposed as illustrated in FIG. 4 and are provided with openings 40 and 42 formed therein respectively adjacent the forward ends thereof. Arms 24 and 36 are pivoted together by means of pin 44 extending therethrough while arms 22 and 38 are pivoted together by means of a pin 46 extending therethrough.

The numeral 48 refers to a toothed roller having an elongated central bore 50 formed therein. Roller 48 includes a plurality of outwardly extending teeth 52 and will be described as having opposite ends 54 and 56. Roller 48 is supported between the arms 36 and 38 by means of a conventional bolt member 58 having a head portion 60 at one end thereof with a nut 62 threadably mounted on the other end thereof. The drawings illustrate that the head portion 60 of bolt member 58 is hexagonal, but such configuration may be varied as long as two parallel and oppositely disposed faces 64 and 66 are provided.

A wing nut 68 is mounted on one end of the bolt member 58 and is preferably stamped from suitable metal material. Wing nut 68 includes a flat central portion 70 having an opening 72 formed therein adapted to receive the bolt member 58 extending therethrough. Basically, central portion 70 defines a parallelogram. A pair of ears 74 and 76 extend upwardly from central portion 70 in a perpendicular relationship with respect thereto. The distance between the ears 74 and 76 is such that the inside surfaces thereof are positioned closely adjacent to the faces 64 and 66 of head portion 60 of bolt member 59 so that rotation of wing nut 68 will cause the rotation of the bolt member 58. Washer element 78 embraces bolt member 58 inwardly of wing nut 68 as viewed in FIG. 4 and is provided with internal teeth 80 which bind themselves to the inner surface of central portion 70 and the outer end of collar 82 which is mounted on the bolt member. Collar 82 includes an outer end 84, central bore 86 and a tapered inner end 88. Collar 90 embraces the other end of bolt member 58 inwardly of nut 62 and has a tapered inner end 92. As seen in FIG. 4, the tightening of nut 62 forces the collars 82 and 90 towards the roller 48 so that the tapered inner ends thereof are partially received by opposite ends of the bore 50 to center the bolt member 58 with respect to the roller. The tightening of nut 62 also causes the washer element 78 to frictionally engage the wing nut 68 and collar 82 so that rotational movement imparted to wing nut 68 will cause collar 82 to be likewise rotated which in turn causes the rotation of roller 48. The frictional engagement between the nut 62, roller 90 and end 56 of roller 48 also aids in imparting rotational movement to the roller.

A slab of fish is indicated at 94 having a skin 96 thereon. In the use of the device, the operator spreads the handle portions and thereby separates the roller 48 from the pressure surface 28. The edge 30 is inserted under the skin as in the operation of the earlier device. The edge 30 need be inserted only a slight distance under the skin and then the handle portions are gripped by the operator. The operator then rotates the wing nut 68 which causes the roller 48 to be rotated as previously described. The roller 48 being thus rotated grips the skin between itself and the pressure surface 28, whereupon rotation of the roller pulls the skin, a severed portion of which is indicated at 98. The edge 30 performs a severing operation and the roller furnishes the means whereby both the skinning and pulling operations are accomplished.

The use of a conventional bolt 58 in a device of this type decreases the manufacturing costs thereof and permits the user to easily replace the bolt member of tighten the same as required. The wing nut 68 is easily stamped from a suitable metal material and the relationship of the wing nut 68 with respect to the head portion 60 provides a rigid connection between the wing nut and the bolt member. The rigid connection between the wing nut 68 and the bolt member 58 is enhanced by the washer element 78, collars 82 and 90, and nut 62. The tapered inner ends of the collars insures that the bolt member 58 will be properly centered with respect to the roller 48 so that the roller 48 will be properly positioned with respect to the pressure surface 28.

Thus it can be seen that the device accomplishes at least all of its stated objectives.

I claim:

1. A hand operated fish skinning tool, comprising, first and second lever members pivoted together and having cooperating handle portions, said first lever member having a toothed roller rotatably mounted therein, said second lever member having a curved pressure surface formed thereon which is adapted to engage and partially extend around said roller on pivoting said first and second lever members toward each other, and an actuating element operatively secured to said roller at one end thereof outwardly of said lever members for rotating said roller by one hand while the other hand is used to squeeze said levers for engaging said pressure surface with the inner surface of the fish skin while said toothed roller engages the outer surface thereof and propels the skin past said pressure surface as said roller is rotated, said first lever member including first and second spaced apart arms positioned outwardly of said pressure surface of said second lever member, said first and second arms having an opening formed therein, a bolt member rotatably extending through said openings in said first and second arms, said bolt member having a head portion at one end thereof and a nut threadably mounted thereon at its other end, said roller being mounted on said bolt member for rotation therewith, said actuating element being operatively secured to said head portion of said bolt member whereby rotation of said actuating element causes said bolt member and said roller to be rotated, said head portion of said bolt member having at least two parallel faces, said actuating element being a wing nut means having a flat central portion having said bolt member extending therethrough, said central portion being disposed between said head portion and said first arm, said wing nut means having first and second flat ear portions extending outwardly from said central portion and being positioned closely adjacent said parallel faces whereby rotation of said wing nut means causes the rotation of said bolt member, said roller having an elongated central bore formed therein which receives said bolt member extending therethrough, a first collar means embracing said bolt member at one end thereof and having an inner end frictionally engaging one end of said roller, said first collar means being rotatably received by the said opening in said first arm, the inner surface of said central portion of said wing nut means operatively frictionally engaging the outer end of said first collar means, a second collar means embracing said bolt member at the other end thereof and having an inner end frictionally engaging the other end of said roller, said second collar means being rotatably received by the said opening in said second arm, the inner surface of said nut operatively frictionally engaging the outer end of said second collar means, the frictional engagement of said first collar means with said wing nut means and said one end of said roller together with the frictional engagement of said second collar means with said nut and the other end of said roller causing said roller to be rotated upon the rotation of said wing nut means.

2. The tool of claim 1 wherein a washer element is positioned between the outer end of said first collar means and the inner surface of said central portion of said wing nut means, said washer element having internal teeth at its central opening which bind themselves to said wing nut means and said first collar means to prevent rotational slippage between said wing nut means and said first collar means.

3. The tool of claim 1 wherein said first and second collar means each have a tapered inner end which partially extends into said central bore of said roller.

4. A hand operated fish skinning tool, comprising, first and second lever members pivoted together and having cooperating handle portions, said first lever member having a toothed roller rotatably mounted therein, said second lever member having a curved pressure surface formed thereon which is adapted to engage and partially extend around said roller on pivoting said first and second lever members toward each other, and an actuating element operatively secured to said roller at one end thereof outwardly of said lever members for rotating said roller by one hand while the other hand is used to squeeze said levers for engaging said pressure surface with the inner surface of the fish skin while said toothed roller engages the outer surface thereof and propels the skin past said pressure surface as said roller is rotated, said first lever member including first and second spaced apart arms positioned outwardly of said pressure surface of said second lever member, said first and second arms having an opening formed therein, a bolt member rotatably extending through said openings in said first and second arms, said bolt member having a head portion at one end thereof and a nut threadably mounted thereon at its other end, said roller being mounted on said bolt member for rotation therewith, said actuating element being operatively secured to said head portion of said bolt member whereby rotation of said actuating element causes said bolt member and said roller to be rotated, said head portion of said bolt member having at least two parallel faces, said actuating element being a wing nut means having a flat central portion having said bolt member extending therethrough, said central portion being disposed between said head portion and said first arm, said wing nut means having first and second flat ear portions extending outwardly from said central portion and being positioned closely adjacent said parallel faces whereby rotation of said wing nut means causes the rotation of said bolt member, said first and second flat ear portions extending perpendicularly outwardly from said central portion, said first and second flat ear portions extending oppositely outwardly from said central portion.

5. A hand operated fish skinning tool, comprising, first and second lever members pivoted together and having cooperating handle portions, said first lever member having a toothed roller rotatably mounted therein, said second lever member having a curved pressure surface formed thereon which is adapted to engage and partially extend around said roller on pivoting said first and second lever members toward each other, and an actuating element operatively secured to said roller at one end thereof outwardly of said lever members for rotating said roller by one hand while the other hand is used to sqeeze said levers for engaging said pressure surface with the inner surface of the fish skin while said toothed roller engages the outer surface thereof and propels the skin past said pressure surface as said roller is rotated, said first lever member including first and second spaced apart arms positioned outwardly of said pressure surface of said second lever member, said first and second arms having an opening formed therein, a bolt member rotatably extending through said openings in said first and second arms, said bolt member having a head portion at one end thereof and a nut threadably mounted thereon at its other end, said head portion and nut being positioned outwardly of said first and second arms of said first lever member, said roller having an elongated central bore formed therein which receives said bolt member extending therethrough, said actuating element being operatively secured to said head portion of said bolt member, first collar means embracing one end of said bolt member between one end of said roller and said actuating element, said first collar means extending through said opening in said first arm, second collar means embracing the other end of said bolt member between the other end of said roller and said nut, said second collar means extending through the opening in said second arm, said first and second collar means having tapered inner ends which partially extend into said central bore of said roller to centrally position the bolt member with respect to the longitudinal axis of said roller, the threadable mounting of said nut on said bolt member causing said first collar means to operatively frictionally engage said actuating element and said one end of said roller and causing said second collar means to frictionally engage said nut and said other end of said roller so that rotation of said actuating element causes said bolt member and said roller to be rotated.

* * * * *